May 3, 1949.  H. D. HARTOUGH ET AL  2,469,334
HALOALKYLATION OF AROMATIC HYDROCARBONS
Filed March 31, 1945
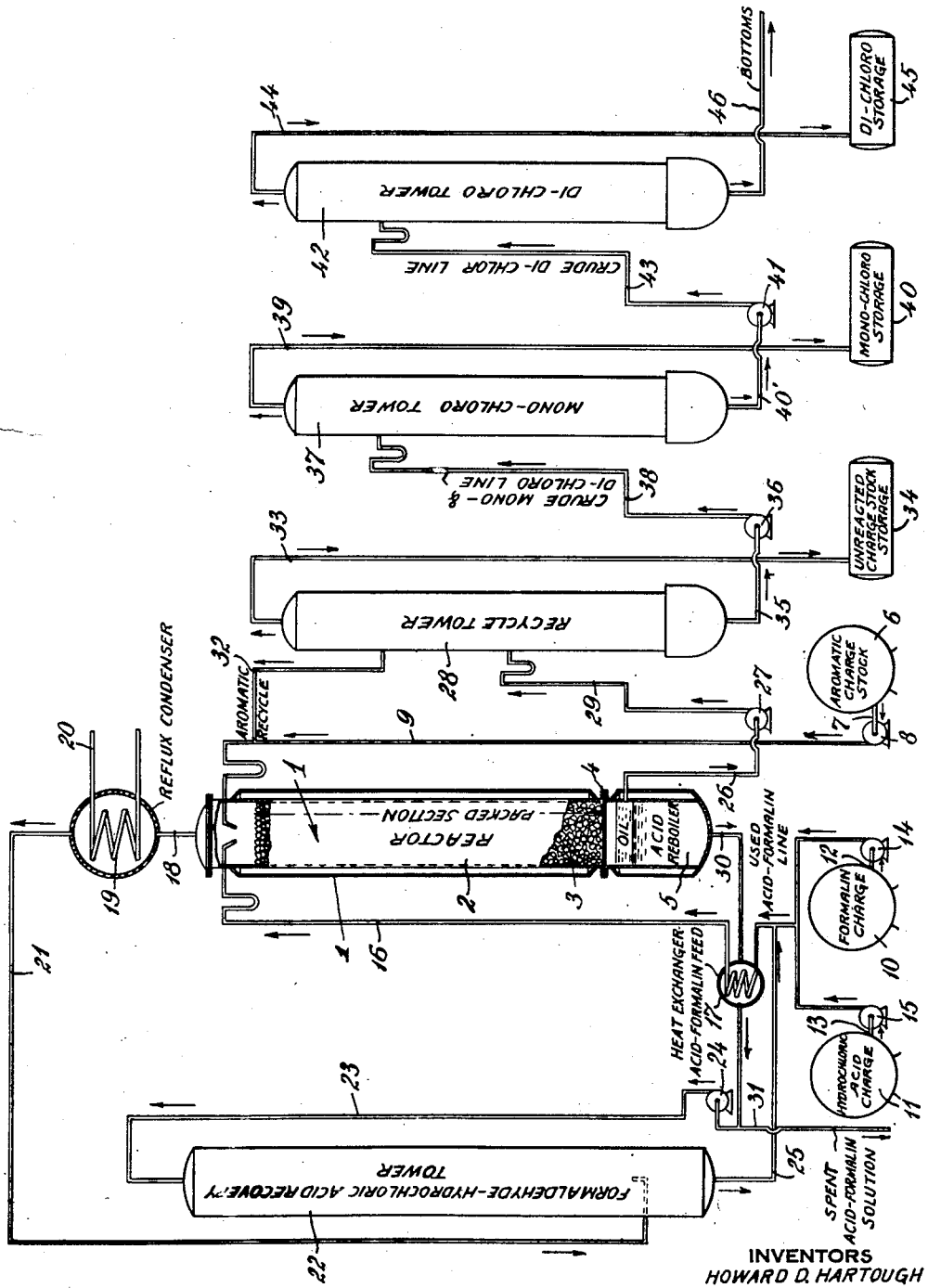
INVENTORS
HOWARD D. HARTOUGH
& PAUL K. CHUNG
BY
AGENT OR ATTORNEY Patented May 3, 1949

2,469,334

UNITED STATES PATENT OFFICE 2,469,334

HALOALKYLATION OF AROMATIC HYDROCARBONS

Howard D. Hartough, Pitman, and Paul K. Chung, Woodbury, N. J., assignors to Socony-Vacuum Oil Company, Incorporated, a corporation of New York Application March 31, 1945, Serial No. 586,000

5 Claims. (Cl. 260—651)

The present invention relates to the haloalkylation of aromatic hydrocarbons, particularly in admixture with nonaromatic hydrocarbons, and, more particularly, to the rapid haloalkylation of aromatic hydrocarbons.

Haloalkylation or, more specifically, chloromethylation has been a laboratory exercise for the past fifty years. There is little evidence that any attempt has been made to employ this useful reaction on an industrial scale demanding the treatment of hundreds or thousands of gallons of aromatic liquids per day except that disclosed in the copending application Serial Number 515,145, filed December 21, 1943. It may well be that this reaction has had little industrial use because, at best, it is a slow reaction for many organic compounds and, in addition, involves a reaction in a heterogeneous system comprising liquid aromatic compound, gaseous or liquid aldehyde and liquid or gaseous hydrogen halide, or both. For example, the chloromethylation of xylene requires seven hours at 60° C. to 70° C. with a yield of less than 68 per cent of theoretical. Similarly, the chloromethylation of naphthalene requires four and one-half hours at 98° C. to 100° C. to provide a 56.5 per cent yield based on the naphthalene used.

A most comprehensive bibliography of chloromethylation is provided by Adams in "Organic Reactions," volume I (1942). Adams gives ninety references all of which describe batch operations with special emphasis on the need for efficient stirring and heating for a period of at least six hours at temperatures of about 65° C. It is also of interest to note that while Grassi and Maselli who first described the reaction taught the use of zinc chloride as a catalyst or dehydrating agent and V. Braun and Dienske reported that the reaction could be carried through without the use of zinc chloride, each of the processes employing aqueous solutions of acid and formaldehyde to which reference is made in Adams (supra) includes the use of hydrogen chloride gas.

We have found that haloalkylation can be carried out in a continuous manner, in much smaller equipment to produce a given amount of product at a vastly accelerated rate and, when employing aqueous hydrogen halide solution and aqueous aldehyde solution, in the absence of additional gaseous hydrogen halide.

The magnitude of the change in the size of equipment will be appreciated by consideration of the size of the equipment necessary to produce a given amount of polyalkyl benzyl chloride from an aromatic petroleum stock such as "Sovasol" #75. By the batch process described in copending application Serial Number 515,145, filed December 21, 1943, a thirty gallon batch reactor is used to produce a given amount of polyalkyl benzyl chloride in eight hours. By means of our novel process the same amount of product can be obtained in a reactor of about 1.5 gallons capacity.

The improvement in the rate of reaction is manifest from the fact that by the new process yields comparable to an eight hour run in the batch reactor are obtained at the end of one-half hour and in one and one-half to two hours yields are obtained which are unobtainable after eight hours in a thirty gallon reactor equipped with efficient means for agitating the liquid contents.

It is an object of the present invention to provide a means for haloalkylating aromatic compounds in the presence of highly porous adsorptive material. It is another object of the present invention to provide means for haloalkylating aromatic compounds by counter-current flow through a tortuous path. It is a further object of the present invention to provide a means for haloalkylating aromatic compounds by co-current and counter-current flow over a surface providing an area sufficient for the formation of a mono-molecular film of aromatic compound. The present invention further provides a means for haloalkylating aromatic compounds in the presence of solid adsorbent contact material in the form of a porous mass or discrete finely-divided particles. The present invention likewise has as an additional object the provision of an apparatus by which the objects of the present invention can be attained. Other objects and advantages will become apparent from the following description taken in conjunction with the drawing which is a flow-sheet of the operations embodying the principles of the present invention.

Generally speaking, satisfactory results are obtained by reacting the liquid hydrocarbon with vapors of an aldehyde and a hydrogen halide in the presence of highly porous adsorptive material or solid adsorbent contact material as hereinafter defined. While the reactants may be employed over a wide range of molecular proportions, especially satisfactory results are obtained when the mole proportion, aromatic hydrocarbon:aldehyde:hydrogen halide is about 1:1.65:5. Ratios within the limits 1:0.25:0.75 to 1:2.5:5 have been used.

The reaction is carried out in such a manner that the aromatic hydrocarbon or hydrocarbons admixed with non-aromatic hydrocarbon or hydrocarbons is contacted in the presence of solid highly porous adsorptive material with the vapors from a boiling mixture of aldehyde and aqueous hydrogen halide. This readily can be accomplished in the apparatus of the drawing.

Any aromatic hydrocarbons or mixtures of aromatic hydrocarbons or mixtures of one or more aromatic hydrocarbons and one or more non-aromatic hydrocarbons may be haloalkylated by the present process. For example, xylene has been haloalkylated with satisfactory yields and mixtures of alkylated benzenes and non-aromatic hydrocarbons have also been haloalkylated satisfactorily. The present process provides an exceptionally satisfactory means for haloalkylating the aromatic constituents of aromatic petroleum stocks.

As those skilled in the art know, aromatic petroleum stocks are mixtures of aromatic hydrocarbons and non-aromatic hydrocarbons, the latter group consisting of paraffins and hydroaromatics or naphthenes. A typical source of such aromatic petroleum stocks are Houdry cracking operations. The mixtures of aromatic and non-aromatic hydrocarbons which are to be used for the purposes of this invention are, generally, those which contain a relatively high percentage of aromatic hydrocarbon constituents, and by way of non-limiting example, those aromatic petroleum stocks sold commercially under the trade-mark "Sovasol" and particularly those known to the solvent industry as "Sovasol" #75. The latter aromatic petroleum stocks are preferred charge stocks especially when polyalkyl benzyl chlorides are desired.

"Sovasol" #75 is a generic term connoting aromatic petroleum stocks derived from Houdry cracking operations. These stocks have boiling point ranges varying between 150° C. and 210° C. and ordinarily contain between 50 per cent and 75 per cent aromatic hydrocarbons and the balance non-aromatic hydrocarbons, depending upon the source of the Houdry cracking stock and the severity of the cracking procedure in the Houdry units. The aromatic hydrocarbons that occur in "Sovasol" #75 stocks are believed to be, primarily, polymethyl benzenes ranging from trimethyl benzene to tetramethyl benzene. It is possible that small amounts of other aromatic hydrocarbons, such as ethyl methyl benzene may be present also. There are three trimethyl benzenes, mesitylene or 1,3,5-trimethyl benzene; pseudocumene or 1,2,4-trimethyl benzene; and hemimellitene or 1,2,3-trimethyl benzene. Likewise, there are three tetramethyl benzenes, durene or 1,2,4,5-tetramethyl benzene; isodurene or 1,2,3,5-tetramethyl benzene; and prehnitene or 1,2,3,4-tetramethyl benzene. The trimethyl benzenes constitute the predominant portion of the polyalkyl benzenes present in "Sovasol" #75 stocks. For example, if a "Sovasol" #75 stock containing 55 per cent aromatic hydrocarbons, is subjected to distillation, the fraction boiling between 150° C. and 182° C. will contain 60 per cent aromatic hydrocarbons and will constitute 75 per cent of the original "Sovasol" #75 stock. This temperature range (150° C.–182° C.), includes the boiling points of the trimethyl benzenes, but does not include the boiling points of the tetramethyl benzenes. Stated differently, the 75 per cent distillate contains about 82 per cent of the aromatic hydrocarbons originally present in the "Sovasol" #75 stock, that boil within the boiling range of trimethyl benzenes.

The solid highly porous adsorptive material or solid adsorbent contact material preferably is in the form of porous masses providing a multiplicity of passageways or a very large surface area. In fact, it can be shown that there is a relation between the surface area of the contact or highly porous adsorptive material, the area of a monomolecular film of the hydrocarbons to be treated and the percentage of the aromatic hydrocarbons which are treated which is converted to aralkyl chloride. However, this relation is only valid within a certain narrow range of mole proportions of aromatic hydrocarbon : aldehyde : hydrogen halide. Superposed on the foregoing relation may be a catalytic effect. Nevertheless, whether the remarkable results obtained by this process be attributable to catalytic effect or to surface area or to both, it can be clearly shown that better results are obtained using certain solid contact or highly porous adsorptive materials than others. Although most satisfactory results are obtained employing solid highly porous adsorptive material or solid adsorbent contact masses in the form of porous bodies presenting a relatively large surface area of contact to the reactants in proportion to the volume, practical results can be obtained employing masses which are relatively inert as surface active material or as adsorbents. A detailed discussion of the end results when employing different materials can best be had in conjunction with a description of the preferred embodiment of means for carrying the present invention into practice as illustrated by the drawing.

Broadly stated, the preferred form of the present process can be described as haloalkylating aromatic hydrocarbons by cocurrent flowing of a stream of aromatic hydrocarbons and a stream of aldehyde and liquid hydrogen halide counter-current to a stream of vapors from a mixture of aldehyde and aqueous hydrogen halide. A simple form of the necessary equipment comprises a reboiler for aqueous aldehyde and hydrogen halide solution, a contact zone providing a tortuous path along which the liquid hydrocarbon and liquid aldehyde and hydrogen halide pass in counter-current flow to the vapors of aldehyde and hydrogen halide, means for introducing fresh aldehyde and liquid hydrogen halide, means for introducing aromatic hydrocarbon, means for removing spent hydrogen halide, means for removing reacted and unreacted hydrocarbon, means for maintaining a predetermined temperature in the contact zone and a reflux condenser. Of course, suitable means for registering the temperature at various places in the apparatus are included.

The drawing is illustrative, but not limiting, in a more or less diagrammatic manner of a unit for carrying out the process of the present invention on an industrial scale.

A suitable means of providing a contact zone comprises a jacketed reactor 1 provided with a packed section 2. The packed section 2 of the reactor is provided with packing material 3 which may be in the form of glass beads, glass helices, Raschig rings, Fiberglass bats, pellets of natural or synthetic alumina-silica gel, silica gel, wood charcoal or activated carbon such as coconut charcoal. It is to be noted that the efficiency of the column appears to be related closely to the nature of the packing material as will be disclosed more clearly hereinafter. The packing material 3 is maintained in place or rests on a suitable shelf or base such as perforated plate 4. Immediately beneath the reactor 1 is reboiler 5 wherein liquid acid drained from reactor 1 is heated to the boiling point so that the vapors rise through the packed tower 1.

Aromatic charge stock, for example, aromatic petroleum stock, in container 6 is drawn through line 7 by pump 8 and discharged through line 9 into reactor 1 at the upper part thereof. Simultaneously, the proportionate amounts of aldehyde and hydrogen halide stored in containers 10 and 11, respectively, are drawn through lines 12 and 13 by pumps 14 and 15 and discharged into the upper part of reactor 1 by means of line 16. It will be noted that the hydrogen halide and aldehyde pass through heat exchanger 17 before entering reactor 1. In heat exchanger 17 the fresh hydrogen halide and aldehyde are heated by heat exchange with used acid-aldehyde withdrawn from reboiler 5 through line 30.

The temperature of the reaction zone in reactor 1 is maintained at about 210° F. by the heat generated by the vaporizer or reboiler 5. The vapors of acid and aldehyde escaping from the reaction zone together with water vapor pass through line 18 into reflux condenser 19 through which coolant is passed by means of coil 20. The uncondensed vapors escaping from condenser 19 pass by line 21 to the base of the recovery tower 22, from which the spent solution is discharged to waste through line 23 and pump 24 and line 31, while the recovered aldehyde-acid solution withdrawn by line 25 and reintroduced into the haloalkylation reaction zone through conduit 16.

The unreacted charge stock, unreacted non-aromatic hydrocarbons and haloalkylated aromatics descend through the reactor tower 1 to the reboiler 5 where the hydrocarbons and haloalkylated hydrocarbons form a layer on the surface of the acid contained therein. The hydrocarbons and haloalkylated hydrocarbons are withdrawn from reboiler 5 by line 26 and pump 27 and discharged into recycle tower 28 by means of conduit 29. Spent acid is withdrawn from reboiler 5 through line 30, passed through heat exchanger 17 and discharged to waste or otherwise through line 31.

In recycle tower 28 the hydrocarbon liquid is resolved into aromatic recycle stock, unreacted charge stock and haloalkylated hydrocarbons. The aromatic recycle stock is removed from tower 28 through line 32 and mixed with fresh aromatic charge stock in line 9. The unreacted charge stock is removed from tower 28 by means of line 33 to storage container 34. The haloalkylated aromatic hydrocarbons are withdrawn from the lower portion of tower 28 through line 35 by pump 36 and introduced into fractionating column 37 through line 38. The haloalkylated hydrocarbons comprise mono-halogenated and di-halogenated hydrocarbons which are separated in fractionator 37, the mono-haloalkylated aromatic hydrocarbons being withdrawn as overhead through line 39 to storage 40 while the di-haloalkylated aromatic hydrocarbons are withdrawn from the lower portion of tower 37 through line 40' and pump 41 and are introduced into the fractionating tower 42 through line 43. In tower 42 the di-haloalkylated aromatic hydrocarbons form the overhead which is withdrawn through line 44 to storage 45. The bottoms are withdrawn from tower 42 through line 46. Means for registering the temperature, such as thermocouples, are placed in various units of the system, as those skilled in the art know, and the temperatures regulated in accordance therewith.

The process of the present invention comprises introducing aromatic hydrocarbon in substantially pure form or in admixture with other substances, such as paraffins and/or napthenes, which are substantially non-reactive under the operating conditions and a mixture of aqueous hydrogen halide, say hydrogen chloride, and an aldehyde, for example formaldehyde, into the packed column or contact zone 1. The halide acid-formaldehyde solution passes down the tower and by gravity settles into the vaporizer 5 wherein it is vaporized and boiled up through the aromatic hydrocarbon which surges back and forth over the packing meanwhile being intimately contacted in a counter-current manner with the vapors of hydrogen chloride and formaldehyde. The heat generated by the vaporizer is utilized to maintain the temperature of the reaction zone at 210° F. to 220° F. The haloalkylated aromatic hydrocarbons and the hydrogen halide-aldehyde solution are withdrawn to receivers 40 and 45, and to waste, respectively, at a rate comparable to that at which the charge stock and hydrogen halide-aldehyde are introduced into the reaction zone. It is preferred to recycle the halo-alkylated stock as well as the vaporized halide-aldehyde if sufficient haloalkylation has not taken place in a single pass. It has been found that three or four passes through the reaction zone are necessary to utilize the most reactive aromatic hydrocarbons in "Sovasol" #75. The ratio of aromatic hydrocarbon introduced and withdrawn from the contact zone to the hydrogen halide-aldehyde solution varies with the molecular weight of the aromatic hydrocarbon, with the precentage of aromatics in the charge stock, and with the relative ease with which the aromatic hydrocarbon in the charge stock haloalkylates.

The conversion of the aromatic hydrocarbons in a single pass or in multiple passes appears to be dependent at least to some extent upon the character of the packing material. Thus, when glass beads, helices or Raschig rings are used as packing material, less than 10 per cent of the aromatic hydrocarbons passed through the contact zone is converted to aralkyl chloride. On the other hand, when 4-mesh silica gel pellets are used as packing material the conversion in one pass is about 20 per cent. Coconut charcoal has provided the most satisfactory packing material. Thus when using activated coconut charcoal a one pass conversion of about 43 per cent of the aromatic hydrocarbons charged is obtained. It is of interest to note that adsorbent contact material such as is used as catalyst in the catalytic cracking of petroleum provides increasing conversion which reaches an upper limit. Thus, for example, 4-mesh alumina-silica gel synthetic alumina-silica cracking catalyst containing about 7 per cent to about 15 per cent aluminum has been used as a packing material. With this packing material a first pass conversion of about 10 percent was obtained. Upon repeated use the conversion was raised to 18 per cent and then to 33 per cent. This is aptly illustrated by the following series of runs in which 1 mole of "Sovasol" #75 containing about 60 per cent aromatic hydrocarbons and the balance paraffinic and naphthenic hydrocarbons were reacted with 1.65 moles of formaldehyde as an aqueous 37 per cent solution and 5 moles of aqueous hydrogen chloride. Three runs, A, B and C, of four passes each, were made as set forth in the following tabulation:

Table I

| Run | Pass No. | Per cent Aromatic Hydrocarbons Converted |
|---|---|---|
| A | 1 | 10 |
|   | 2 | 25 |
|   | 3 | 37 |
|   | 4 | 43 |
| B | 1 | 18 |
|   | 2 | 39 |
|   | 3 | 52 |
|   | 4 | 61 |
| C | 1 | 33 |
|   | 2 | 40 |
|   | 3 | 60 |
|   | 4 | 68 |

It is to be observed that each run of four passes was made with fresh charge stock and fresh aldehyde-halide solution. It will be noted that the per cent conversion in the first pass increased from run A to run C and that the maximum total conversion in multiple passes is reached after three runs of four passes each. It is to be expected that the hydrogen halide leaches some alumina from the packing material thereby increasing the total area of contact. To check this possibility some of the same lot of 4-mesh pellets of synthetic alumina-silica cracking catalyst were allowed to stand in 500 cubic centimeters of concentrated hydrogen chloride for twenty-four hours. At the end of that time the acid was removed by decantation and 500 cubic centimeters of fresh concentrated acid were poured over the once leached pellets. This procedure was repeated with fresh acid for fourteen days and then the leached pellets were dried. Two hundred and twenty-six grams of the drier leached pellets were used as packing material in the contact zone with the following conversions.

Table II

| Run | Pass No. | Per cent Aromatic Hydrocarbons Converted |
|---|---|---|
| A | 1 | 18 |
|   | 2 | 26 |
|   | 3 | 37 |
|   | 4 | 44 |
| B | 1 | 19 |
| C | 1 | 20 |

When the foregoing tabulation is compared with that of Table I, certain differences are notable. For example, when unleached synthetic alumina-silica cracking catalyst was employed as packing material the conversion in the first pass increased with each successive run. On the other hand, when leached synthetic alumina-silica cracking catalyst was employed as packing material the conversion in the first pass of successive runs is substantially the same. This is manifest in the following tabulation:

Table III

| Run | Pass No. | Per cent Aromatic Hydrocarbons Converted | |
|---|---|---|---|
|   |   | Unleached Alumina-Silica Gel | Leached Alumina-Silica Gel |
| A | 1 | 10 | 18 |
| B | 1 | 18 | 19 |
| C | 1 | 33 | 20 |

Thus it would appear that the alumina-silica gel packing material leached in the presence of hydrocarbons, aldehyde, hydrogen halide and water becomes activated whereas when leached with cold concentrated hydrogen chloride and dried, the leached alumina-silica gel packing material is not so activated. It is to be noted that the mole ratio of aromatic hydrocarbon:aldehyde: hydrogen halide was the same in each series of runs.

Comparison of the conversion in the first pass of run A using unleached synthetic alumina-silica cracking catalyst as packing material and of the conversion in the first pass of run A using leached synthetic alumina-silica cracking catalyst as packing material, is indicative that the unleached material and the leached material are comparable in efficiency as packing material, although the efficiency of the leached material remains substantially constant in a second and third run. This is manifest in the following tabulation:

Table IV

| Run | Pass No. | Per cent Conversion of Aromatic Hydrocarbon | |
|---|---|---|---|
|   |   | Unleached | Leached |
| A | 1 | 10 | 18 |
|   | 2 | 25 | 26 |
|   | 3 | 37 | 37 |
|   | 4 | 43 | 44 |

The only discrepancy is in the per cent conversion in the first pass. This discrepancy may very well be due to additive errors in determining the per cent conversion. Thus, it would appear that certain packing materials, for example, synthetic alumina-silica gels, can be activated. On the other hand, silica gel does not appear to be activated as is apparent in the following tabulation of a series of two runs:

Table V

| Run | Pass No. | Per cent Aromatic Hydrocarbons Converted |
|---|---|---|
| A | 1 | 18 |
| B | 1 | 22 |

Therefore, it can be said that certain gel packing materials can be activated and other gel packing materials are not activated. The line of division between the two groups would appear to be drawn between single constituent gels and multiple constituent gels, one component of which at least is soluble in at least one of the reactants. Thus, alumina-silica gels, leachable glasses and the like belong to the class of activatable packing material while silica gel and the like belong to the group of non-activatable packing material.

A third group of packing materials can also be recognized. To this group belong those materials of organic nature primarily which provide a higher conversion on the first pass than the materials of the first two groups and like the second of the first two groups are not activated by contact with the reactants. Typical of this third group is activated coconut charcoal. The data collected in Table VI illustrates the latter of these characteristics of the third group of packing materials.

Table VI

| Run | Pass No. | Per Cent Aromatic Hydrocarbons Converted |
|---|---|---|
| A | 1 | 48 |
| B | 1 | 41 |
| C | 1 | 40 |
| D | 1 | ¹ 44 |
|   | 2 | 44 |
|   | 3 | 58 |
|   | 4 | 62 |

¹ Average 43%.

The data presented in Table VII clearly shows that the packing materials of the third group are more efficient in a one pass operation than the packing materials of groups one and two.

Table VII

| Class | Packing Material | Pass No. | Per Cent Aromatic Hydrocarbon Converted |
|---|---|---|---|
| 1 | Fiber glass | 1 | 10 |
| 1 | Silica gel | 1 | ¹ 20 |
| 1 | Leached alumina-silica synthetic cracking catalyst. | 1 | 18 |
| 2 | Unleached alumina-silica synthetic cracking catalyst. | 1 | 10 |
| 3 | Coconut charcoal | 1 | ¹ 43 |

¹ Average.

Although the efficiencies of various packing materials have been discussed hereinbefore and the acceptable packing materials divided into three groups on the basis of an explanation for the recognizable differences, it is to be understood that the present invention is not to be limited by such explanations or hypotheses. Whether a packing material of group one or of group two or of group three be employed, the product is substantially the same, i. e., aralkyl chloride with small amounts of di-aralkyl chloride, the differences between the various classes of packing materials being most readily recognized in the rate of conversion and the increased conversion on subsequent passes when materials of class two are employed.

Hereinbefore it has been pointed out that with certain packing materials there appears to be a relation between the total area of the packing material, the area of a monomolecular film of the hydrocarbon charge and the per cent conversion. The data set forth in Table VIII is illustrative of this apparent relation when the reactants are employed in the ratio of 2 moles of aromatic hydrocarbons to 3.3–5 moles of formaldehyde to 10 to 15 moles of hydrogen chloride.

It will be appreciated that the foregoing comparison is based upon the conversion in the first pass.

Those skilled in the art will appreciate that the broad concepts of the invention as well as certain distinguishing characteristics have been discussed in the foregoing. It is believed that the discussion provided hereinbefore will assist in a better understanding of the results described hereinafter in a discussion of examples illustrative of certain embodiments of the invention.

EXAMPLE I

An apparatus employing the principles illustrated by the drawing was used for this experiment. The tower packing was #4 mesh pellets of synthetic alumina-silica cracking catalyst. 500 cubic centimeters (2 moles of aromatic hydrocarbon) of an aromatic charge stock containing 60 per cent aromatics (essentially trimethyl benzenes obtained by taking a 75 per cent overhead distillate of "Sovasol" #75) whose boiling point was 300° F. to 356° F., was charged to the hydrocarbon reservoir. 1500 cubic centimeters of a mixture of 20° Bé. hydrochloric acid and aqueous formaldehyde (5 moles of formaldehyde and 15 moles of hydrogen chloride) was charged into the acid-formaldehyde reservoir.

Enough acid-formaldehyde solution was added to a reactor, previously heated to 210° F., to fill the vaporizer. "Sovasol" #75 was then added until it was above the product take-off line. The acid-formaldehyde was heated to boiling and thirty minutes allowed for equilibrium to be reached. Fresh "Sovasol" #75 and fresh acid-formaldehyde were then introduced into the reactor at relative rates corresponding to the respective volumes. The take-off of product and used acid-formaldehyde was maintained at a rate comparable to that of the charge. Five to six hours was required for each pass.

The material was recycled twice by returning the respective hydrocarbon mixture and used acid-formaldehyde to the respective reservoir.

In the following table is listed the per cent conversions for the "Sovasol" #75 after each of the three passes in this experiment.

| Pass No. | Per Cent Conversion | Per Cent Chlorine |
|---|---|---|
| 1 | 29.3 | |
| 2 | 42.0 | |
| 3 | 52.0 | 8.67 |

Distillation of 168 grams of product, specific gravity, 0.900, yielded 26.5 grams of trimethyl benzyl chlorides whose refractive index was 1.5410 at 21.5° C. compared with 1.5411 at 20° C. for trimethyl benzyl chlorides in batch process. There Table VIII

| Packing Material | Class | Surface Area of Packing Material (sq. m. × 10³) | Area of Monomolecular Film of Hydrocarbon (sq. m. × 10³) | Ratio Surface Area of Packing Material to Area of Monomolecular Film | Observed Per cent Aromatic Hydrocarbon Conversion |
|---|---|---|---|---|---|
| Silica gel | 1 | 218.12 | 1,288 | 17/100 | 20 |
| Coconut charcoal | 3 | 633.12 | 1,288 | 49/100 | 43 |
| Unleached synthetic alumina-silica cracking catalyst | 2 | 54 | 1,288 | 4/100 | 10 | was a residue of 21 grams of material that proved to be the dichloromethylated "Sovasol" #75.

EXAMPLE II

The procedure in this example was identical to that in Example I except that 500 cubic centimeters (2 moles) of "Sovasol" #75 (specific gravity 0.829 at 72° F.) and 1000 cubic centimeters of hydrochloric acid-formaldehyde solution was used (3.3 moles $CH_2O$ and 10 moles HCl). A series of three runs of four passes each were made.

|  | Pass No. | Percent Conversion of Aromatics |
|---|---|---|
| Run A | 1 | 10. |
|  | 2 | 24. |
|  | 3 | 36.1 |
|  | 4 | 42.3 |
| Run B | 1 | 17.7 |
|  | 2 | 37.7 |
|  | 3 | 50. |
|  | 4 | 59.2 |
| Run C | 1 | 31.5 |
|  | 2 | 39.2 |
|  | 3 | 58.5 |
|  | 4 | 66.2 |

EXAMPLE III

Commercial xylene was chloromethylated as in Example I. The apparatus is the same with the exception that the tower was packed with Fiberglass. This run was made using equimolar ratios of xylene and formaldehyde and a 3 molar excess of hydrochloric acid.

| Pass No. | Percent Chlorine | Percent Conversion |
|---|---|---|
| 1 | 3.55 | 15.4 |
| 2 | 7.36 | 32.0 |
| 3 | 9.77 | 42.5 |

EXAMPLE IV

A synthetic alumina-silica cracking catalyst was leached with concentrated hydrochloric acid by the following procedure. 500 cubic centimeters of the catalyst was allowed to stand in 500 cubic centimeters of concentrated hydrochloric for twenty-four hours. At the end of that time the acid was removed by decantation and 500 cubic centimeters of fresh acid was poured over the pellets. This procedure was repeated daily for fourteen days and then the pellets were dried and 22 cubic inches thereof were charged into the apparatus shown in the drawing. The procedure for the continuous chloromethylation was identical to Example I. The following data were obtained.

|  | Pass No. | Percent Conversion of Aromatics |
|---|---|---|
| Run A | 1 | 18 |
|  | 2 | 26 |
|  | 3 | 37 |
|  | 4 | 44 |
| Run B | 1 | 19 |
| Run C | 1 | 20 |

Runs B and C were made primarily to determine whether the packing had reached a stable point. This cold leached catalyst, therefore, is stabilized since the above data are well within experimental error.

EXAMPLE V

A reactor was packed with #4 mesh silica gel (Davco Chemical Company). The following data were collected in single pass operations:

Per cent Conversion
Run A ------------------------------- 18
Run B ------------------------------- 22

These runs check with the cold-leached synthetic alumina-silica cracking catalyst in the previous example.

EXAMPLE VI

A different reactor was employed for this run which differed from others only the length of the reaction tube. This column is roughly three times the length of the other reactor. It was packed alternately with 18.5 cubic inches of Fiberglass, 49.5 cubic inches of activated coconut charcoal and 12.4 cubic inches of glass beads. The latter were used as a weight to keep the charcoal from floating in the reactants. Using identical conditions as in Example II hereof the following data were obtained:

|  | Pass No. | Percent Conversion |
|---|---|---|
| Run A | 1 | [1] 48 |
| Run B | 1 | 41 |
| Run C | 1 | 40 |
| Run D | 1 | 44 |
|  | 2 | 44 |
|  | 3 | 58 |
|  | 4 | 62 |

[1] 28% of the formaldehyde was required to produce this conversion figure.

It should be pointed out here that each new run was made using fresh "Sovasol" #75 and fresh acid-formaldehyde. Run D was a four pass operation recycling the same reactant mixture in each pass.

From the data listed above it would seem that recycling of the product in this case was not too practical because of the low conversion on subsequent passes. The more practical procedure when employing this packing material would be to increase the time of a single pass to obtain maximum conversion.

Vacuum distillation of a sample obtained by compositing five runs including the four given above, weighing 1957 grams and having a specific gravity of 0.895 at 72° F. gave the following results:

| Cut No. | B. P. at 4 mm., °C. | Sp. g. at 72° F. | Wt. of Cut | Per cent of Total | $N_D^{20}$ |
|---|---|---|---|---|---|
| IBP | 38 |  |  |  |  |
| 1 | 70 | 0.814 | 1,182 | 60.4 |  |
| 2 | 80 | 0.860 | 38 | 1.7 |  |
| 3 | 90 |  | 18 | 0.9 |  |
| 4 | 98 | 1.035 | 57 | 2.9 | 1.5389 |
| 5 | 100 | 1.040 | 82 | 4.2 | 1.5395 |
| 6 | 101 | 1.045 | 115 | 5.9 | 1.5412 |
| 7 | 104 | 1.045 | 74 | 3.8 | 1.5412 |
| 8 | 106 | 1.045 | 129 | 6.6 | 1.5420 |
| 9 | 112 | 1.045 | 42 | 2.1 | 1.5420 |
| 10 | 120 |  | 27 | 1.4 | 1.5439 |
| Residue |  |  | 184 | 9.4 |  |
| Loss |  |  |  | 0.7 |  |

Summary

Per cent
Cut 1—Unreacted "Sovasol" #75 ----------------------- 60.4
Cuts 4-10—Trimethyl benzyl chlorides ---------------- 26.9
Residue—Dichloromethylated "Sovasol" #75 ----------- 9.4

EXAMPLE VII

The reactor employed in Example VI was used substituting 310 grams of 2 to 4-mesh wood charcoal for the coconut charcoal. The aromatic hydrocarbon : formaldehyde : hydrogen halide ratio was 1:1.65:5. In other respects the conditions were the same as in previous examples.

| | Pass No. | Per cent Conversion of Aromatics |
|---|---|---|
| Run A | 1 | 29.4 |
| Run B | 1 | 24.5 |
| | 1 | 27.8 |
| Run C | 2 | 40.5 |
| | 3 | 46.0 |
| | 4 | 56.4 |

EXAMPLE VIII

*Run A.*—Apparatus and same packing described in Example VI used. 500 cubic centimeters of "Sovasol" #75 (2 moles of trimethyl benzenes contained therein) and 300 cubic centimeters of acid-formaldehyde solution containing 0.5 mole of formaldehyde and 1.5 moles of hydrochloric acid were used. The procedure was the same here as in Example IV above. The gravity of the finished product (single pass operation) was 0.858 which constituted a 46 per cent yield based on the formaldehyde used.

*Run B.*—Apparatus and same packing described in Example IV used. 500 cubic centimeters of "Sovasol" #75 (2 moles of trimethyl benzenes) and 600 cubic centimeters acid-formaldehyde solution containing one mole of formaldehyde and three moles of acid were used as the reactants. The procedure was the same as in Example IV above. The gravity of the finished product was 0.866 which constituted a 30 per cent yield based on the formaldehyde used.

EXAMPLE IX

The same apparatus was used as for Example I. 500 cubic centimeters of xylene (4 moles, specific gravity 0.860 at 72° F.). This experiment was run using silica gel tower packing. Molar ratio same as in Example III.

| Pass No. | Percent Conversion |
|---|---|
| 1 | 30 |
| 2 | 40 |
| 3 | 49 |

EXAMPLE X

Apparatus same as used in Example I. Molar ratios of xylene to formaldehyde to acid were 1:0.5:3. Single pass operation yielded a product whose specific gravity at 72° F. was 0.906. This is equivalent to 57.5 per cent conversion based on the formaldehyde.

The results of the procedures followed in Examples I to X, both inclusive, are set forth in Table IX.

*Table IX*

| Example | Run | Pass No. | Hydrocarbon Charge | Moles Aromatics | Moles CH$_2$O | Moles HCl | Packing Material | Percent conversion | Percent conversion |
|---|---|---|---|---|---|---|---|---|---|
| I | | 1 | Sovasol #75 | 2 | 5 | 15 | 4 mesh Al$_2$O$_3$-SiO$_2$* | 29.3 | |
| | | 2 | | | | | | 42.0 | 12.7 |
| | | 3 | | | | | | 52 | 10.0 |
| II | A | 1 | do | 2 | 3.3 | 10 | do | 10 | |
| | | 2 | | | | | | 25 | 15 |
| | | 3 | | | | | | 37 | 12 |
| | | 4 | | | | | | 43 | 6 |
| | B | 1 | do | 2 | 3.3 | 10 | do | 18 | |
| | | 2 | | | | | | 39 | 21 |
| | | 3 | | | | | | 52 | 13 |
| | | 4 | | | | | | 62 | 10 |
| | C | 1 | do | 2 | 3.3 | 10 | do | 33 | |
| | | 2 | | | | | | 40 | 7 |
| | | 3 | | | | | | 60 | 20 |
| | | 4 | | | | | | 68 | 8 |
| III | | 1 | Xylene | 4 | 4 | 3 molar excess | Fiberglass | 15.4 | |
| | | 2 | | | | | | 32.0 | 16.6 |
| | | 3 | | | | | | 42.5 | 10.5 |
| IV | A | 1 | Sovasol #75 | 2 | 5 | 15 | Leached Al$_2$O$_3$-SiO$_2$ | 18.0 | |
| | | 2 | | | | | | 26.0 | 8.0 |
| | | 3 | | | | | | 37.0 | 11.0 |
| | | 4 | | | | | | 44.0 | 7.0 |
| | B | 1 | do | 2 | 5 | 15 | do | 19.0 | |
| | C | 1 | do | 2 | 5 | 15 | do | 20.0 | |
| V | A | 1 | do | 2 | 3.3 | 10 | 4 mesh SiO$_2$** | 18 | |
| | B | 1 | do | 2 | 3.3 | 10 | do | 22 | |
| VI | A | 1 | do | 2 | 3.3 | 10 | Coconut charcoal | 48 | |
| | B | 1 | do | 2 | 3.3 | 10 | do | 41 | |
| | C | 1 | do | 2 | 3.3 | 10 | do | 40 | |
| | D | 1 | do | 2 | 3.3 | 10 | do | 44 | |
| | | 2 | | | | | | 44 | 0.0 |
| | | 3 | | | | | | 58 | 14.0 |
| | | 4 | | | | | | 62 | 4.0 |
| VII | A | 1 | do | 2 | 3.3 | 10 | 2 to 4-mesh wood charcoal | 29.4 | |
| | B | 1 | do | 2 | 3.3 | 10 | do | 24.5 | |
| | C | 1 | do | 2 | 3.3 | 10 | do | 27.8 | |
| | | 2 | | | | | | 40.5 | 12.7 |
| | | 3 | | | | | | 46.0 | 5.5 |
| | | 4 | | | | | | 56.4 | 10.4 |
| VIII | A | 1 | do | 2 | 0.5 | 1.5 | Coconut charcoal | 22 | |
| | B | 1 | do | 2 | 1.0 | 3.0 | do | 29 | |
| IX | | 1 | Xylene | 4 | 4 | 7.0 | 4 mesh SiO$_2$** | 30 | |
| | | 2 | | | | | | 40 | 10.0 |
| | | 3 | | | | | | 49 | 9.0 |
| X | | | do | 1 | 0.5 | 3.0 | Fiberglass | 30 | |

*Synthetic alumina-silica cracking catalyst.
**Silica gel.

While the hydrogen halide is generally employed in amounts in excess of theoretical proportions, the proportions in which aromatic hydrocarbon and aldehyde are reacted will be dictated in a large measure by the economic factors controlling the choice. Either of these reactants may be used in excess of the theoretical proportion as required by the particular circumstances of a specific situation. Consequently, the molal ratio of hydrocarbon to aldehyde may be varied from an excess of hydrocarbon to an excess of aldehyde. In this relation those skilled in the art will understand that "in excess of the theoretical proportions" or "excess" is relative to the amount of each reactant as determined by the theoretical equation for the reaction which may be represented as follows:

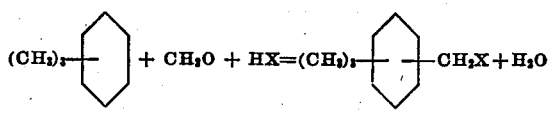

Although it is preferred and generally desirable to carry out the reaction employing such proportions of aromatic hydrocarbons, aldehyde and hydrogen halide that a major portion of the aromatic hydrocarbons react, for some purposes it is preferred to use such quantity of aldehyde that only a portion of the aromatic hydrocarbons react. The halo-alkylated hydrocarbons are then separated in any suitable manner from the unreacted material and the unreacted material is again treated with less than the stoichiometric quantity of aldehyde to halo-alkylate further quantities of the aromatic hydrocarbons. Illustrative of such a stepwise halo-alkylation of aromatic hydrocarbons is the following example.

Example XI

An apparatus employing the principles illustrated by the drawing was used. The tower packing was coconut charcoal. The reactants were employed in the proportion of 1 mole of aromatic hydrocarbons : 0.227 mole of formaldehyde : 0.67 mole of acid. In other words, 4 liters of "Sovasol" #75 were reacted with 1.25 liters of an acid formaldehyde solution. 11.8 per cent of the aromatic hydrocarbons present in the charge was converted to polyalkyl benzyl halide. After 355 minutes the charge was distilled and fractionated as indicated in Table X.

*Table X*

| Cut No. | B. P. at 0.9 mm. | Sp. G. at 72° F. | Wt. of Cut, g. | $n_D^{20}$ |
|---|---|---|---|---|
| IBP | 30 | | | |
| 1 | 43 | 0.822 | 2,725 | |
| 2 | 50 | 0.835 | 106 | 1.4762 |
| 3 | 60 | 0.856 | 48 | 1.4857 |
| 4 | 70 | | 8.5 | 1.4918 |
| 5 | 76 | | 12 | 1.5202 |
| 6 | 78 | | 25 | 1.5350 |
| 7 | 78 | | 25 | 1.5378 |
| 8 | 78 | | 25 | 1.5400 |
| 9 | 79 | | 26 | 1.5408 |
| 10 | 80 | | 26 | 1.5410 |
| 11 | 82.5 | | 26 | 1.5410 |
| 12 | 86 | | 26 | 1.5408 |
| 13 | 94 | | 24 | 1.5410 |
| Residue | >94 | | 55 | Crystalline |
| Total | | | 3,169 | |
| Loss | | | 11 | |

The first fraction boiling at 43° C. at 0.9 millimeter of mercury pressure amounting to about 3.315 liters was reacted a second time in the same apparatus employing the reactants in the proportion of 1 mole of aromatic hydrocarbons : 0.3 mole of formaldehyde : 0.9 mole of hydrogen halide. After about six hours the material was removed from the apparatus and a portion of the non-aqueous material subjected to distillation. The charge was fractionated as indicated in Table XI. Fractions 7 and 8 are fairly pure 2,4,6-trimethyl benzyl chloride and cuts and fractions 11 and 12 are pure 2,4,5-trimethyl benzyl chloride.

*Table XI*

| Cut. No. | B. P. at 2.4 mm. ° C. | Sp. G. at 72° F. | Wt. of Cut, g. | $n_D^{20}$ |
|---|---|---|---|---|
| IBP | 32 | | | |
| 1 | 33 | 0.820 | 847 | |
| 2 | 40 | 0.820 | 840 | |
| 3 | 40 | 0.820 | 338 | |
| 4 | 50 | 0.820 | 358 | |
| 5 | 60 | 0.850 | 44 | 1.4834 |
| 6 | 70 | | 5 | 1.5186 |
| 7 | 80 | | 25 | 1.5370 |
| 8 | 80 | | 25 | 1.5390 |
| 9 | 82 | | 27 | 1.5409 |
| 10 | 83 | | 26 | 1.5413 |
| 11 | 88 | | 45 | 1.5420 |
| 12 | 90 | | 37 | 1.5422 |
| Residue | | | 26 | Crystalline |
| Total | | | 2,644 | |
| Loss | | | 5 | |

Although the present invention has been described in conjunction with certain preferred embodiments thereof, it is to be understood that the claims are not to be limited thereby. Thus, for example, non-alkylated aromatic hydrocarbons such as benzene, mono-alkylated aromatic hydrocarbons such as toluene, polyalkylated aromatic hydrocarbons having more than three alkyl substituents, mono- and polyalkylated aromatic hydrocarbons in which one or more of the alkyl substituents may have more than one carbon atom and mono- and polyalkylated polynuclear aromatic hydrocarbons in which one or more of the alkyl groups have one or more carbon atoms, may be treated in the manner described herein. The term "aromatic compound" wherever employed herein is to be understood to include all of the foregoing carbocyclic compounds. Similarly, aliphatic aldehydes other than formaldehyde, such as acetaldehyde, propionaldehyde, butyraldehyde and the like having up to and including seven carbon atoms in addition to the carbonyl carbon as well as aromatic aldehydes such as benzaldehyde may be used. It will also be understood that the term hydrogen halide includes hydrogen bromide, hydrogen iodide and hydrogen fluoride as well as hydrogen chloride. It is also to be understood that the aromatic hydrocarbon may be treated as such or admixed with non-reactive diluents or contaminants and that "non-reactive diluents or contaminants" includes substances which are reactive with the aldehyde and/or hydrogen halide but not in a manner deleterious to the quality or yield of the product. In addition, it is to be understood that packing materials other than those specifically mentioned may be used. For example, Attapulgas clay, Florida earth, Montmorillonite type clay (activated or non-activated) and, in fact, any material not soluble to any substantial extent, although leachable, in hydrogen halides in the concentration employed and of the type which provides a porous mass, may be employed as packing or contact material. Furthermore, carbons other than coconut charcoal may be used. Those skilled in the art will appreciate that the yields obtained will vary with the mole proportions as well as with the type of packing material and the specific packing material.

We claim:

1. The continuous method for forming a halo-alkylated aromatic compound, which comprises: intimately contacting an aromatic compound, with an aldehyde in aqueous solution and with a hydrogen halide in aqueous solution, in the presence of a contact material consisting of a solid, highly porous adsorptive material presenting a relatively large surface area of contact to the reactants in proportion to the volume, to form a reaction mixture containing said haloalkylated aromatic compound; separating said haloalkylated aromatic compound from said reaction mixture; and recycling the remainder of said reaction mixture in intimate contact with said adsorptive material.

2. The method of claim 1 wherein the adsorptive material is an activated charcoal.

3. The continuous method for forming a haloalkylated aromatic compound, which comprises: flowing a stream of liquid aromatic hydrocarbon over the surface of a contact material consisting of a solid, highly porous adsorptive material presenting a relatively large surface area of contact to the reactants in proportion to the volume, counter-current to a stream of aqueous aldehyde solution and of aqueous hydrogen halide solution, to form a reaction mixture containing said haloalkylated aromatic compound; separating said haloalkylated aromatic compound from said reaction mixture; and recycling the remainder of said reaction mixture over said adsorptive material.

4. The continuous method for forming a chlormethylated aromatic compound, which comprises: intimately contacting an aromatic compound with aqueous formaldehyde and with aqueous hydrogen chloride, in the presence of a contact material consisting of a solid, highly porous adsorptive material presenting a relatively large surface area of contact to the reactants in proportion to the volume, to form a reaction mixture containing said chlormethylated compound; separating said chlormethylated compound from said mixture; and recycling the remainder of said mixture in intimate contact with said adsorptive material.

5. The continuous method for forming a mixture of chlormethylated aromatic compounds, which comprises: intimately contacting an aromatic hydrocarbon fraction having a boiling range from about 300° F. to about 356° F., with aqueous formaldehyde and with aqueous hydrogen chloride, in the presence of a solid, highly porous adsorptive material consisting of an activated charcoal, to form a reaction mixture containing said chlormethylated aromatic compounds; separating said chlormethylated aromatic compounds from said reaction mixture; and recycling the remainder of said reaction mixture in intimate contact with said adsorptive material.

HOWARD D. HARTOUGH.
PAUL K. CHUNG.

REFERENCES CITED

The following references are of record in the file of this patent:

UNITED STATES PATENTS

| Number | Name | Date |
| --- | --- | --- |
| 1,727,682 | Tschunkur | Sept. 10, 1929 |

OTHER REFERENCES

Stephen et al., "Jour. Chem. Soc." (British), 1920, pages 510–517.